US012364634B2

(12) United States Patent
Calkin

(10) Patent No.: US 12,364,634 B2
(45) Date of Patent: Jul. 22, 2025

(54) RESCUE STRETCHER

(71) Applicant: Skedco, Inc., Tualatin, OR (US)

(72) Inventor: Carston R. Calkin, Tualatin, OR (US)

(73) Assignee: Skedco, Inc., Tualatin, OR (US)

( * ) Notice: Subject to any disclaimer, the term of this patent is extended or adjusted under 35 U.S.C. 154(b) by 199 days.

(21) Appl. No.: 18/464,210

(22) Filed: Sep. 9, 2023

(65) Prior Publication Data

US 2024/0082078 A1 Mar. 14, 2024

Related U.S. Application Data

(60) Provisional application No. 63/375,186, filed on Sep. 9, 2022.

(51) Int. Cl.

*A61G 1/044* (2006.01)
*A61G 1/04* (2006.01)
*A61G 1/00* (2006.01)

(52) U.S. Cl.

CPC ............... *A61G 1/044* (2013.01); *A61G 1/04* (2013.01); *A61G 1/00* (2013.01)

(58) Field of Classification Search

CPC .. A61G 1/044; A61G 1/04; A61G 1/00; A61F 5/37; A61F 5/3761; A61F 5/3769; A61F 5/3776

USPC ............. 5/628, 625; 128/869, 870, 876, 882

See application file for complete search history.

(56) References Cited

U.S. PATENT DOCUMENTS 1,270,107 A 6/1918 Boardman
2,361,789 A 10/1944 Nicholas
2,366,082 A 12/1944 Baker
2,519,376 A 8/1950 Emoulous
2,788,530 A 4/1957 Ferguson
2,899,692 A 8/1959 Finken
2,935,751 A 5/1960 Emmick et al.
3,046,982 A 7/1962 Davis
3,158,875 A 12/1964 Fletcher
3,287,895 A 11/1966 Hire
3,707,734 A 1/1973 Matthews
4,127,120 A 11/1978 Applegate
(Continued)

FOREIGN PATENT DOCUMENTS

DE 202017101921 U1 7/2018
EP 3162347 A1 5/2017
(Continued)

OTHER PUBLICATIONS

International Search Report and Written Opinion for Application No. PCT/US2023/073812, mailed Jan. 22, 2024, 6 pages.
(Continued)

*Primary Examiner* — Robert G Santos
(74) *Attorney, Agent, or Firm* — Stoel Rives LLP

(57) ABSTRACT

A stretcher including a flexible base panel sized to support a person lying thereon during a rescue or extrication operation. The base panel includes a header end and an opposite footer end, and further includes a plurality of securement straps, a shoulder harness, and a leg harness coupled to the base panel to help restrain the injured person and prevent further injury that may be caused such as by having the person roll off the sides of the stretcher. The leg harness may be configured to function as a junctional tourniquet to minimize blood loss at the pelvic region in the case of severe injury to the person.

20 Claims, 11 Drawing Sheets

(56) References Cited

U.S. PATENT DOCUMENTS

| | | | | |
|---|---|---|---|---|
| 4,151,842 | A | 5/1979 | Miller | |
| 4,283,068 | A | 8/1981 | Keyser | |
| 4,347,635 | A | 9/1982 | Eisenhauer | |
| 4,601,075 | A | 7/1986 | Smith | |
| 5,014,374 | A | 5/1991 | Williams | |
| 5,027,833 | A | 7/1991 | Calkin | |
| 5,048,134 | A | 9/1991 | Dennill et al. | |
| 5,121,514 | A | 6/1992 | Rosane | |
| 5,179,746 | A * | 1/1993 | Rogers | A61G 1/0231 5/628 |
| 5,211,186 | A | 5/1993 | Shoemaker et al. | |
| 5,285,797 | A | 2/1994 | Zeller | |
| 5,435,323 | A | 7/1995 | Rudy | |
| 5,729,850 | A | 3/1998 | Eskeli | |
| D421,413 | S | 3/2000 | Calkin | |
| 6,227,201 | B1 | 5/2001 | Ferko, III | |
| 6,860,272 | B2 * | 3/2005 | Carter | A61B 5/055 5/651 |
| 6,871,368 | B2 | 3/2005 | Calkin | |
| 6,966,087 | B2 | 11/2005 | Robinette | |
| 7,168,110 | B2 * | 1/2007 | Girard | A61G 1/01 5/628 |
| 7,422,220 | B2 | 9/2008 | Walkingshaw et al. | |
| 7,810,820 | B2 | 10/2010 | Wolf et al. | |
| 8,286,284 | B2 * | 10/2012 | Fee | A61G 1/01 5/628 |
| 8,667,629 | B2 | 3/2014 | Mohr et al. | |
| 8,677,530 | B2 | 3/2014 | Calkin | |
| D712,796 | S | 9/2014 | Calkin | |
| 9,173,789 | B2 | 11/2015 | Haskell et al. | |
| 9,827,152 | B1 | 11/2017 | Calkin | |
| 9,974,701 | B1 * | 5/2018 | Haskell | A61G 1/044 |
| 10,292,878 | B2 * | 5/2019 | Perez | A61G 1/013 |
| 10,583,055 | B2 * | 3/2020 | Cable | A61G 1/04 |
| 11,071,663 | B1 * | 7/2021 | Cable | A61G 1/048 |
| 11,311,430 | B2 | 4/2022 | Calkin | |
| 11,344,457 | B2 | 5/2022 | Calkin | |
| 2004/0088794 | A1 | 5/2004 | Calkin | |
| 2005/0132495 | A1 * | 6/2005 | Girard | A62B 1/02 5/89.1 |
| 2005/0165293 | A1 * | 7/2005 | Carter | A61B 6/0421 600/407 |
| 2007/0136950 | A1 | 6/2007 | Zuercher | |
| 2007/0192926 | A1 | 8/2007 | Fee et al. | |
| 2008/0184488 | A1 | 8/2008 | Fee et al. | |
| 2010/0005593 | A1 | 1/2010 | Bowling et al. | |
| 2010/0233922 | A1 | 9/2010 | Cynamon | |
| 2011/0185504 | A1 | 8/2011 | Kenalty et al. | |
| 2011/0296609 | A1 | 12/2011 | Giap | |
| 2012/0102650 | A1 | 5/2012 | Mcglynn | |
| 2012/0151679 | A1 | 6/2012 | Kenalty et al. | |
| 2012/0272451 | A1 * | 11/2012 | Haskell | A61G 1/01 5/628 |
| 2015/0143634 | A1 | 5/2015 | Beaulieu et al. | |
| 2015/0283006 | A1 | 10/2015 | Akins | |
| 2015/0313778 | A1 | 11/2015 | Chia et al. | |
| 2016/0075539 | A1 | 3/2016 | Calkin | |
| 2016/0176683 | A1 | 6/2016 | Huehn | |
| 2017/0027782 | A1 | 2/2017 | Jenson | |
| 2017/0112693 | A1 * | 4/2017 | Cable | A61G 1/04 |
| 2018/0092789 | A1 * | 4/2018 | Perez | A61G 1/013 |
| 2018/0289568 | A1 | 10/2018 | Allen | |
| 2021/0106473 | A1 | 4/2021 | Calkin | |
| 2024/0082078 | A1 * | 3/2024 | Calkin | A61G 1/048 |

FOREIGN PATENT DOCUMENTS

| | | | | |
|---|---|---|---|---|
| WO | 2005039475 | A1 | 5/2005 | |
| WO | 2008097873 | A1 | 8/2008 | |
| WO | WO-2024055024 | A1 * | 3/2024 | A61G 1/044 |

OTHER PUBLICATIONS

ARC Products LLC, Med-Sled Vertical Lift Rescue, 2009, 2 pages.

Veasey, et al., “Confined Space Entry and Emergency Response”, 2002, pp. 429-433, The McGraw-Hill Companies, Inc., U.S.

* cited by examiner

RESCUE STRETCHER

RELATED APPLICATION DATA

This application is a nonprovisional of and claims the benefit under 35 U.S.C. § 119(e) of U.S. Provisional Patent Application No. 63/375,186, filed Sep. 9, 2022, the disclosure of which is incorporated by reference herein in its entirety.

TECHNICAL FIELD

The field of the disclosure relates generally to rescue stretchers with multiple straps and/or harnesses for securing and transporting an injured person during emergency situations. In particular, the disclosure relates to such rescue stretchers designed to be lightweight, quickly deployable, and suitable for lifting the injured person to a secondary location for diagnostics and treatment.

BACKGROUND

Transporting an incapacitated or injured person to a hospital or other treatment facility is often an essential part of providing proper medical care. An ambulance, helicopter, or other similar vehicle is well-known for such transport. However, in some instances, such as when the injured person is in a forested area, on an embankment, on a battlefield, or trapped in tight, confined spaces (e.g., in vehicles or buildings) transport vehicles may not be a feasible initial option for securing and transporting the injured person. In these situations, lightweight and easily deployable stretchers, litters, and other similar devices are generally known for facilitating such casualty movement. To help prevent further injury, these devices generally include restraints or straps to immobilize the injured person during transport. Accordingly, in cases where access to an injured person may be limited, the injured person may be transported on the lightweight stretchers from the injury site to a first location (e.g., a medical tent) for treatment or for loading onto an ambulance (or other rescue vehicle) and thereafter taken to the hospital or other treatment facility as needed.

The present inventor has recognized several disadvantages with conventional lightweight stretchers. For example, many conventional stretchers include restraints or straps that are not sufficiently adjustable to provide both a snug and comfortable fit to securely retain the injured person and avoid exacerbating the injuries, while also providing some sense of comfort for the injured person during transport. In addition, many lightweight stretchers lack sufficient support for the injured person to minimize the potential of causing further injury during transport. For example, during some rescue operations, the injured person may be dragged across rough terrain (e.g., rocks, rubble, or other debris) on the lightweight stretcher. Without appropriate support, the debris may cause discomfort and possibly further injury as the injured person is dragged through the debris. Moreover, many lightweight stretchers are not optimally designed to minimize wear on the restraints and straps during dragging extractions. Finally, many lightweight stretchers are not sufficiently sturdy or otherwise equipped to support air lift evacuations, while firmly restraining the injured person in the rescue stretcher and protecting the person to avoid causing further injury.

Accordingly, the present inventor has recognized a need for an improved rescue stretcher that offers a streamlined design for quick deployment, efficient patient packaging, and rapid horizontal and/or vertical hoist capabilities for expeditious evacuations. The present inventor has also recognized a need for such an improved rescue stretcher with various attachment points to facilitate air lift evacuations, and to provide protective support for the injured person during transport. Additional aspects and advantages will be apparent from the following detailed description of example embodiments, which proceeds with reference to the accompanying drawings.

DETAILED DESCRIPTION OF EXAMPLE EMBODIMENTS

With reference to the drawings, this section describes embodiments of a rescue stretcher and its detailed construction and operation. Throughout the specification, reference to "one embodiment," "an embodiment," or "some embodiments" means that a described feature, structure, or characteristic may be included in at least one embodiment. Thus, appearances of the phrases "in one embodiment," "in an embodiment," or "in some embodiments" in various places throughout this specification are not necessarily all referring to the same embodiment. Furthermore, the described features, structures, and characteristics may be combined in any suitable manner in one or more embodiments. In view of the disclosure herein, those skilled in the art will recognize that the various embodiments can be practiced without one or more of the specific details or with other methods, components, materials, or the like. In some instances, well-known structures, materials, or operations are not shown or not described in detail to avoid obscuring aspects of the embodiments.

FIGS. 1-11 collectively illustrate various details and embodiments of a rescue stretcher 100, 900 designed for supporting and safely extracting an injured person 50 from a hazardous environment. The following description proceeds with a general reference to features of the rescue stretcher 100 of FIG. 1, followed by a more detailed description of the rescue stretchers 100, 900 with reference to the figures. It should be understood that while the following description references rescue stretcher 100, many of the same features described with reference to the rescue stretcher 100 apply equally to the embodiment of the rescue stretcher 900 illustrated in FIGS. 9-11 unless otherwise noted.

Figure 1:
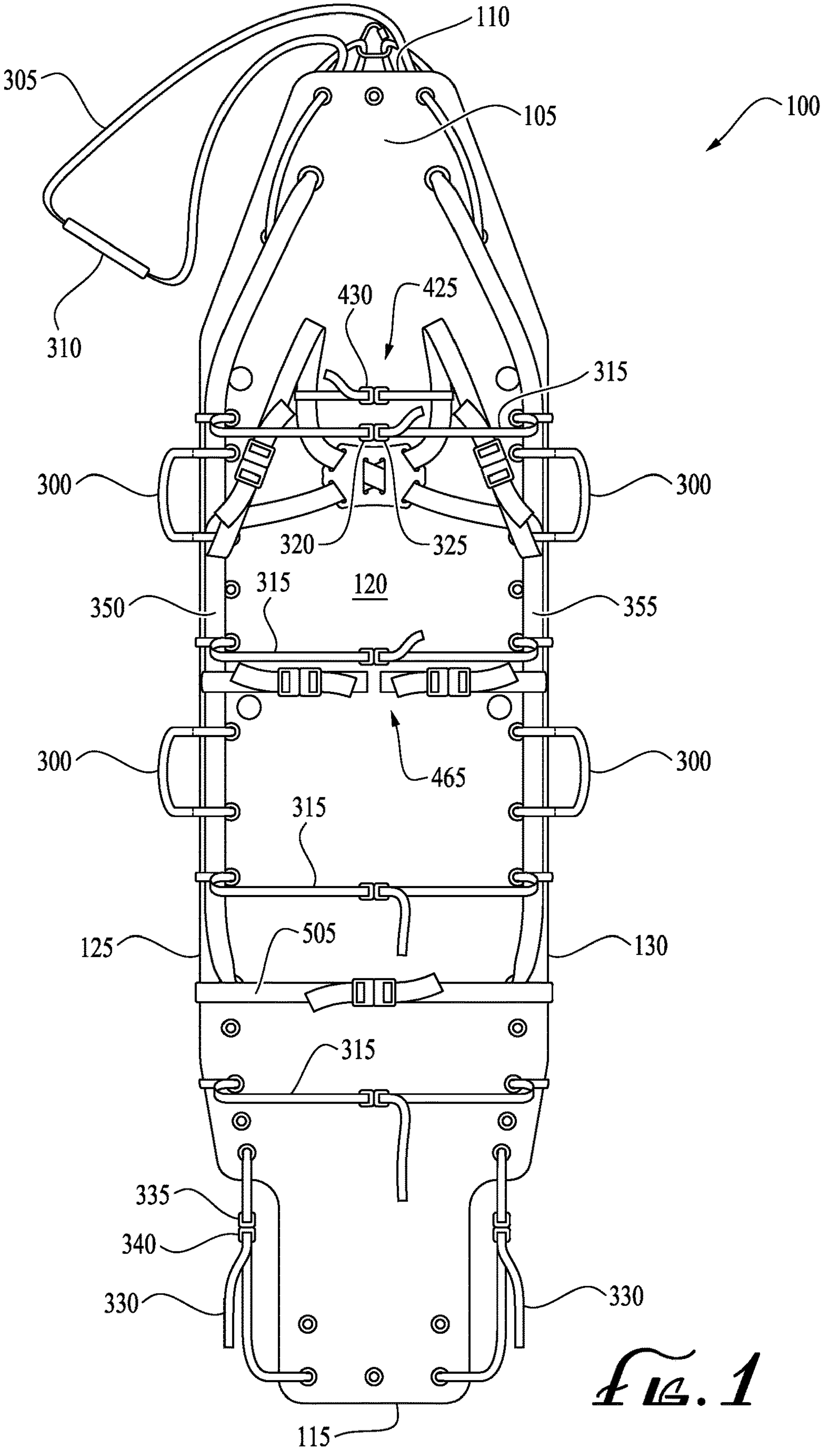
FIG. 1 illustrates a rescue stretcher in a flat configuration with a harness system and various securement straps in a buckled configuration in accordance with one embodiment.

With general reference to FIG. 1, the rescue stretcher 100 includes an elongated, flexible base panel 105 having a plurality of eyelets (see FIG. 3 for additional detail) spaced along the left and right peripheral edges 125, 130, respectively of the base panel 105. A plurality of loop handles 300 are coupled to the base panel 105 and spaced apart along the respective peripheral edges 125, 130 to aid evacuation personnel in carrying an injured person 50 (see FIG. 5) from the hazardous environment to another location for treatment. The rescue stretcher 100 further includes a drag strap 305 coupled to the base panel 105 and extending along the header end 110 to aid in dragging extractions as further described in detail below.

The rescue stretcher 100 includes a harness system 345 (see FIG. 4) including a chest harness 425 and a leg harness 465, and further includes various securement straps 315 for securing the person 50 to the base panel 105 for transport and lift slings 515, 520 (see FIG. 8) for accommodating air-lift rescues when needed. As described in detail below, the harness system 345 helps further stabilize the person 50 while restrained in the rescue stretcher 100 to minimize the risk of further injury during transport. In addition, as further described in detail below, the harness system 345, slings 515, 520, and straps 315 may be coupled to the rescue stretcher 100 to facilitate efficient deployment for both horizontal and vertical hoist extractions. As illustrated in FIG. 5, in one example configuration, the securement straps 315 extend transversely across the base panel 105. When securement straps 315 are tightened, the base panel 105 rolls inwardly to cradle person 50 and help prevent the person 50 from rolling off the base panel 105. The securement straps 315 and the foot end straps 330, when secured and tightened, support the person 50 and collectively limit movement of the person 50 toward the header end 110 and the footer end 115 of rescue stretcher 100. As illustrated, the foot end straps 330 urge the footer end 115 to roll inwardly to create a footrest and arrest movement of the person downwardly toward the footer end 115.

In the following description of the figures and any example embodiments, reference may be made to using the rescue stretcher disclosed herein to support and transport injured person. It should be understood that any such references merely refer to one example use for such a rescue stretcher and should not be considered as limiting. Other uses for such rescue stretcher with the characteristics and features described herein are possible, including uses to transport captured animals/game, or transporting equipment, firewood, ammunition, or other heavy loads (including for both military and civilian uses). Still other uses not specifically described herein may be possible. In addition, the following disclosure may include references to an injured person's body parts and/or regions of the body. It should be understood that any such discussion is meant to facilitate description and establish a frame of reference relating to a typical injured person with all limbs and body parts intact. Accordingly, any such references are for convenience only and should not be considered as limiting.

Figure 2:
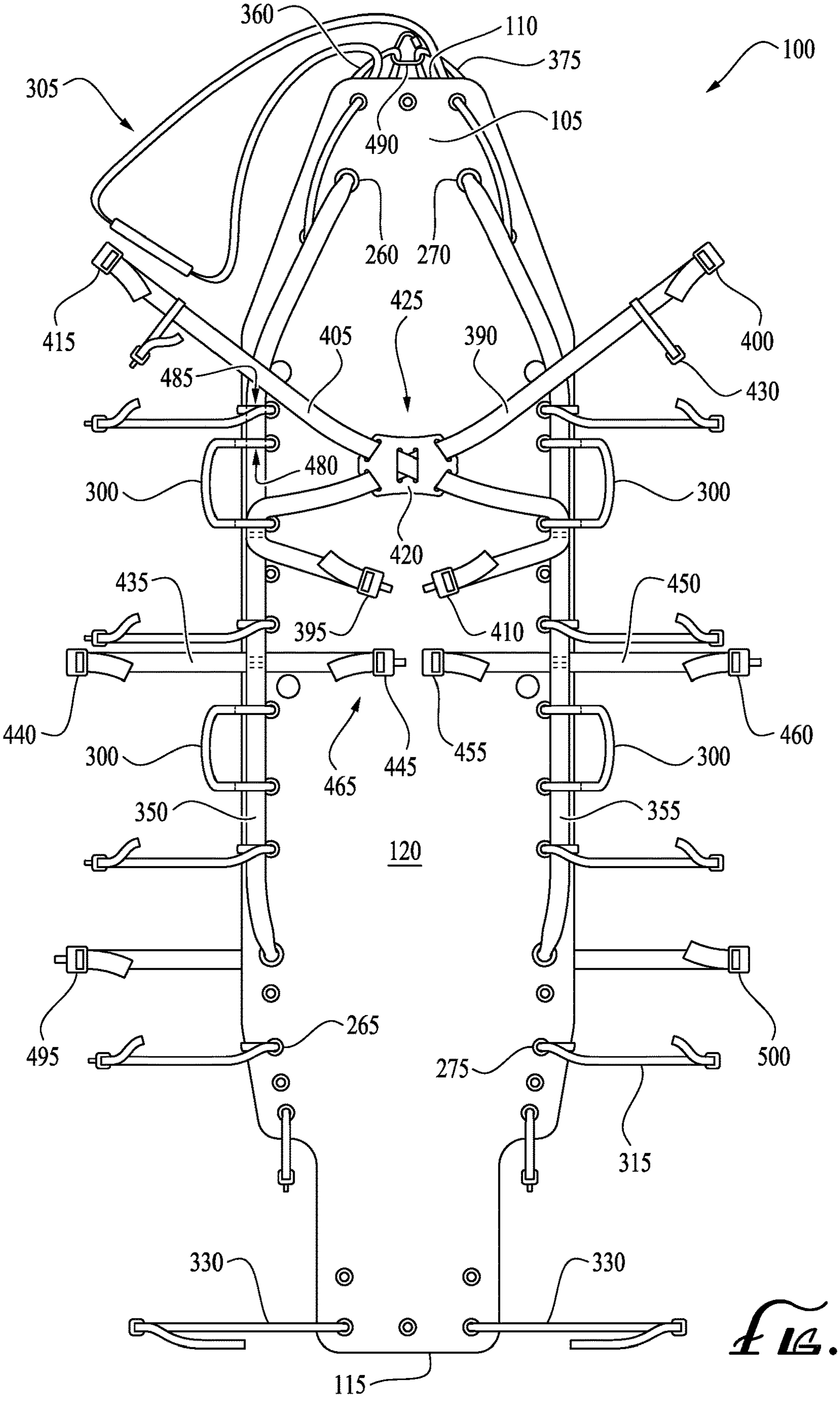
FIG. 2 illustrates the rescue stretcher of FIG. 1 with the harness system and the securements straps in an unbuckled and extended configuration.
Figure 3:
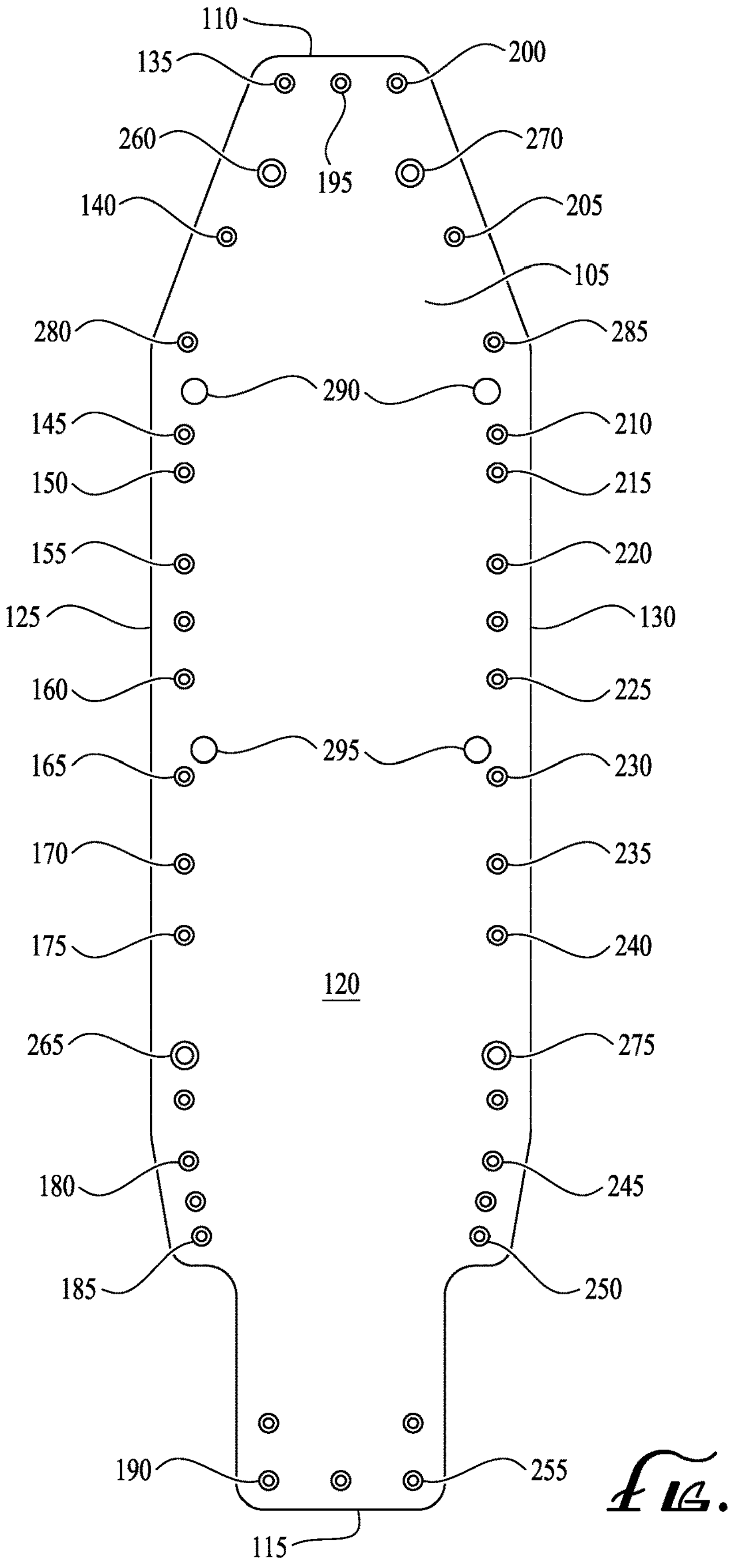
FIG. 3 illustrates the rescue stretcher of FIG. 1 with the harness system and the securement straps removed to illustrate features of a base panel.

FIGS. 1 and 2 illustrate a rescue stretcher 100 in a flat configuration in accordance with one embodiment. To establish a frame of reference, FIG. 1 illustrates the various straps and harnesses of the rescue stretcher 100 in a buckled configuration, and FIG. 2 illustrates the same straps and harnesses in an unbuckled and extended configuration. FIG. 3 illustrates the rescue stretcher 100 with the harnesses and straps removed to illustrate additional features of the rescue stretcher 100. With collective reference to FIGS. 1-3, the following describes the components of the rescue stretcher 100 and their respective functionality to restrain and secure the person 50 for transport.

With collective reference to FIGS. 1-3, the rescue stretcher 100 includes an elongated base panel 105 formed of a lightweight and flexible material with strength and durability characteristics suitable for supporting the weight of an injured person 50 during transport. In one embodiment, the base panel 105 comprises a single sheet of lightweight plastic material, such as medium-density polyethylene or a synthetic thermoplastic resin, selected for durability, strength, flexibility and resistance to damage (such as from cutting, scarring, denting, breaking, and deforming) to provide a suitable rescue stretcher 100 for carrying injured people. The base panel 105 includes a header end 110 and a footer end 115 opposite the header end 110. The base panel 105 further includes a front surface 120 and an opposite back surface (not shown), and opposite left and right peripheral edges 125, 130 spanning between the header and footer ends 110, 115. For reference, the front surface 120 refers to a surface of the base panel 105 that receives the injured person 50 during an intended use of rescue stretcher 100. Similarly, the back surface (not shown) refers to the opposite surface of the base panel 105 that typically contacts the ground surface when the rescue stretcher 100 is deployed for loading the injured person 50 and/or during a dragging operation.

Overall, the base panel 105 may have suitable dimensions for receiving and comfortably supporting the injured person 50. For instance, in one example embodiment, the base panel 105 may have a length (as measured from header end 110 to footer end 115) ranging from between 80-100 inches and a width (as measured from left peripheral edge 125 to right peripheral edge 130) ranging from between 22 to 28 inches. For reference, the rescue stretcher 100 illustrated in FIGS. 1-8 has a width of approximately 22.5 inches, and the rescue stretcher 900 illustrated in FIGS. 9-11 has a width of approximately 28 inches. In some embodiments, the base panel 105 may range in thickness from between 1/16 inches to about 1/4 inches. It should be understood that the dimensions described illustrate one example embodiment and that any suitable dimensions may be used. For instance, the length and width dimensions of the rescue stretchers 100, 900 may be smaller for rescue stretchers targeted primarily for use with children or may be wider and/or longer to accommodate various sizes for adult use.

As illustrated in FIGS. 1-3, in some embodiments, the base panel 105 may not have a uniform width throughout but may instead include one or more tapered sections adjacent the header and footer ends 110, 115. For example, with reference to FIG. 1, the left and right peripheral edges 125, 130 of the base panel 105 may taper inwardly toward the header end 110 from an upper portion of the base panel 105 (e.g., a portion near the shoulder area of the person 50), and may taper inwardly toward the footer end 115 from a lower portion of the base panel 105. In some embodiments, the left and right peripheral edges 125, 130 may uniformly and gradually taper toward the header end 110 to define a generally trapezoidal upper region for supporting the head of the injured person 50. In such embodiments, the base panel 105 is narrower at the header end 110 as compared to a generally central body-supporting region of the front surface 120 of the base panel 105. In such a configuration, the rescue stretcher 100 receives and supports the head of the injured person 50 without obstructing the sides of the head of the injured person 50 when the rescue stretcher 100 is in an operative configuration (as illustrated in FIG. 5 for example). Similarly, the left and right peripheral edges 125, 130 may taper inwardly toward the footer end 115 to accommodate the lower leg region of the injured person 50 and support the formation of a footrest section as further described below. Generally, the tapered sections of the base panel 105 may aid in rolling the base panel 105 to secure and support the injured person 50 therein during use.

With particular reference to FIG. 3, the base panel 105 includes a plurality of openings or eyelets (labeled using reference numerals 135 through 285 as shown) distributed throughout that may be drilled, cut, punched, machined, or otherwise formed on the base panel 105 using any suitable techniques. In some embodiments, some or all of the eyelets may be reinforced using metal grommets to reduce a risk of the base panel 105 tearing adjacent the eyelets. In the following description, various specific eyelets of the base panel 105 are referenced for illustration purposes, but it should be understood that in other embodiments, other combinations of eyelets may be used without departing from the principles of the disclosed subject matter. In some examples, the eyelets may each be spaced inwardly between approximately two to four inches from the corresponding peripheral edges 125, 130 of the base panel 105. As illustrated and further described in detail below, corresponding eyelets formed on the peripheral edges 125, 130 are aligned relative to one another to receive various loop handles 300 and allow for the coupling of securement straps 315 that cross the base panel 105. The base panel 105 further includes a plurality of corresponding pairs of openings 290, 295 inset from the peripheral edges 125, 130 for receiving lift slings 515, 520 to accommodate air lift extractions as described in further detail with reference to FIG. 8.

Returning to FIG. 1, the rescue stretcher 100 includes a plurality of loop handles 300, where each loop handle 300 is threaded through a corresponding pair of eyelets of base panel 105. For example, in one embodiment, the rescue stretcher 100 includes a total of four loop handles 300, with two loop handles disposed along each of the peripheral edges 125, 130, respectively. Along the peripheral edge 125, one loop handle 300 may be weaved through eyelets 150, 155 and another loop handle 300 may be weaved through eyelets 165, 170 (see FIG. 3). Similarly, along the peripheral edge 130, one loop handle 300 may be weaved through eyelets 215, 220 and another loop handle 300 may be weaved through eyelets 230, 235. In this configuration, the loop handles 300 form two sets of handle pairs on either side of the base panel 105, with each loop handle 300 sufficiently spaced apart from an adjacent loop handle 300 along the respective peripheral edges 125, 130 to provide adequate spacing for people to carry rescue stretcher 100 during an extraction operation. In one example embodiment, the upper handles 300 may be arranged and generally aligned with the chest and shoulders of the person 50 and the lower handles 300 may be arranged and generally aligned with the buttocks and upper thigh region of the person 50 (see FIG. 5 for example). This configuration helps stabilize the rescue stretcher 100 when carried and may help avoid or minimize bending of the base panel 105 or creating unnecessary stresses on the person 50.

The loop handles 300 are generally sized with sufficient space to accommodate an adult human hand and may be formed from a reinforced webbing material to provide sufficient strength for carrying the load on the base panel 105. In one embodiment, the loop handles 300 are formed from a single webbing material that is threaded through the respective eyelets and then box-stitched to affix the loop handle 300 to the base panel 105. In such embodiments, the loop handles 300 are box stitched in such a way so as to form a small passage 480 through which the elongated webbing members 350, 355 are weaved as further described in detail below with particular reference to FIGS. 2-4. In other embodiments, the loop handles 300 may be formed from other suitable materials. It should be understood that other embodiments may include any number of loop handles 300 arranged in a different configuration than the one described herein.

In some embodiments, the rescue stretcher 100 further includes a drag strap 305 threaded through a pair of eyelets 135, 140 along the peripheral edge 125 and through eyelets 200, 205 along the peripheral edge 130 of the base panel 105. To couple the drag strap 305 to the base panel 105, the drag strap 305 may include a pair of knotted ends (see for example rescue stretcher 900 of FIG. 9) seated along the front surface 120 (or the rear surface) of the base panel 105 against eyelets 280, 285, respectively. As illustrated in FIG. 1, the drag strap 305 extends upwardly beyond the header end 110 of the rescue stretcher 100 and may include a looped handle with a grip 310 to provide a grasping point for rescue personnel. In some embodiments, the drag strap 305 may be made of reinforced webbing or other suitable material with sufficient tensile strength for carrying out a dragging extraction operation of the injured person 50. In other embodiments, the rescue stretcher 100 may include multiple drag straps (not shown) for facilitating dragging by more than one rescuer or allowing a single rescuer to pull the person 50 with two hands. Other arrangements not specifically described herein may be possible.

With reference to FIG. 1, the rescue stretcher 100 further includes a plurality of securement straps 315 stretching transversely across base panel 105 and over person 50 for securing person 50 within rescue stretcher 100 when in use (see FIG. 5). The securement straps 315 are each weaved through a corresponding pair of eyelets along the peripheral edges 125, 130 of the base panel 105. For example, in one embodiment, the rescue stretcher 100 includes four securement straps 315, where a first securement strap 315 is weaved through eyelets 145, 210, a second securement strap 315 is weaved through eyelets 160, 225, a third securement strap 315 is weaved through eyelets 175, 240, and a fourth securement strap 315 is weaved through eyelets 180, 245. Each securement strap 315 includes mating first and second buckle parts 320, 325 (labeled for the uppermost securement strap 315 to avoid obscuring other aspects of FIG. 1) of a two-piece buckle system for securing the person 50 on the rescue stretcher 100. When the securement straps 315 are fastened via the mating buckles 320, 325 and cinched tightly over the injured person 50, the securement straps 315 restrain the injured person 50 against the base panel 105 and also maintain the inwardly curved or rolled profile (see FIG. 5) of the rescue stretcher 100 to further protect the injured person 50 during transport.

Preferably, the securement straps 315 are each made of a continuous elongate strip of sturdy fabric, such as woven nylon webbing, although, other reinforced materials may also be suitable. In other embodiments, the straps 315 may not be continuous and may instead comprise multiple segments of material. In addition, various buckle types may be used for the described two-piece buckle, such as a three-way buckle, double bar buckle, swivel bar buckle, or others. Preferably, the buckle parts described above are each constructed from strong materials, such as metals, but may otherwise be constructed from other suitable materials.

With reference to FIG. 1, the rescue stretcher 100 further includes a pair of foot end straps 330 arranged along the footer end 115 of the base panel 105. One foot end strap 330 may be weaved through the eyelets 185, 190 along the peripheral edge 125, and the other foot end strap 330 may be weaved through the eyelets 250, 255 along the peripheral edge 130. The foot end straps 330 each include mating buckles 335, 340 (labeled for one strap in FIG. 1) operating in a similar fashion as the mating buckles 320, 325 of the securement straps 315. When the foot end straps 330 are fastened and cinched, they work together to pull the footer end 115 inwardly and create a footrest to allow the feet of the injured person 50 to rest against the curled footer end 115 (see FIG. 5).

Figure 4:
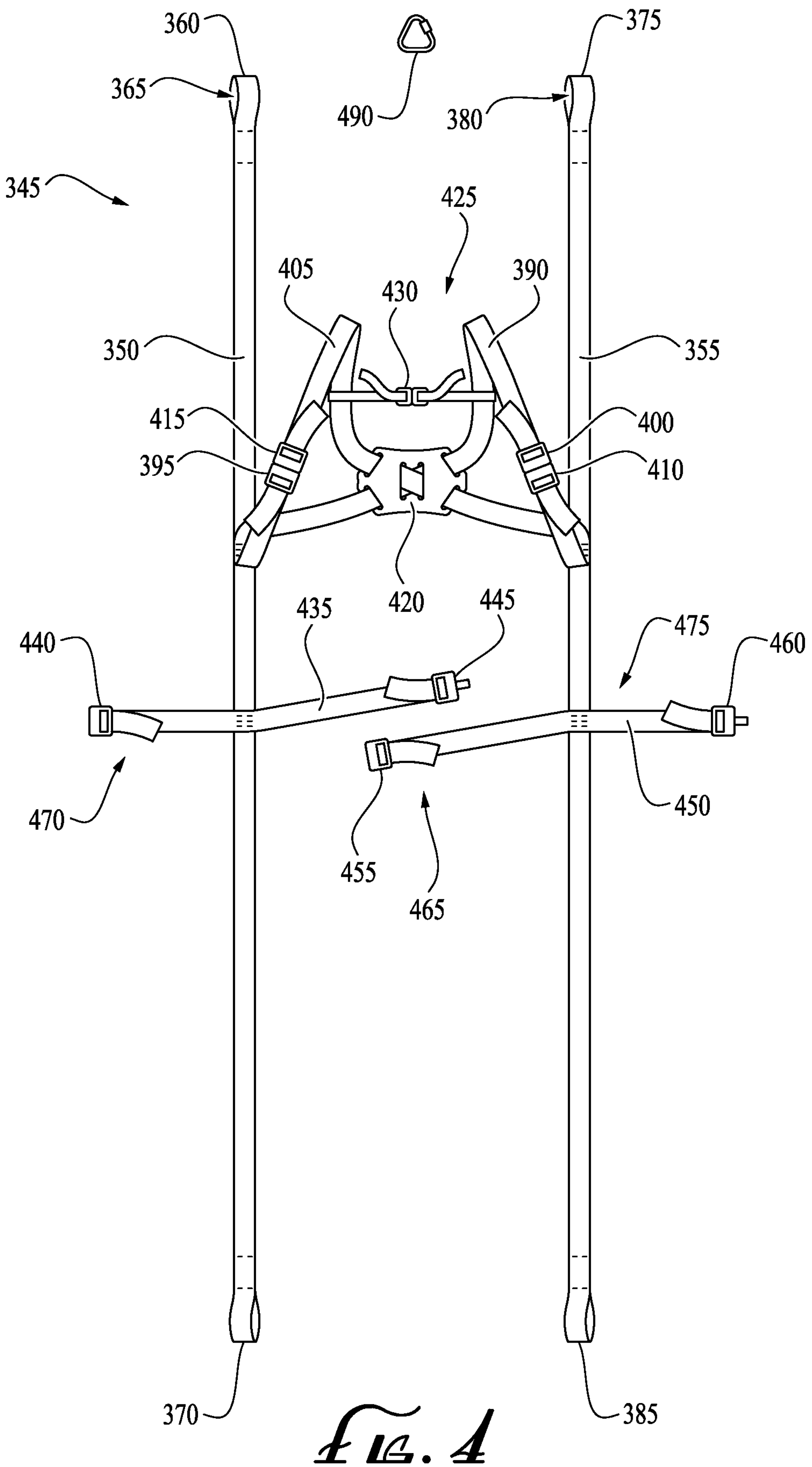
FIG. 4 illustrates the harness system removed from the base panel of the rescue stretcher of FIG. 1.
Figure 5:
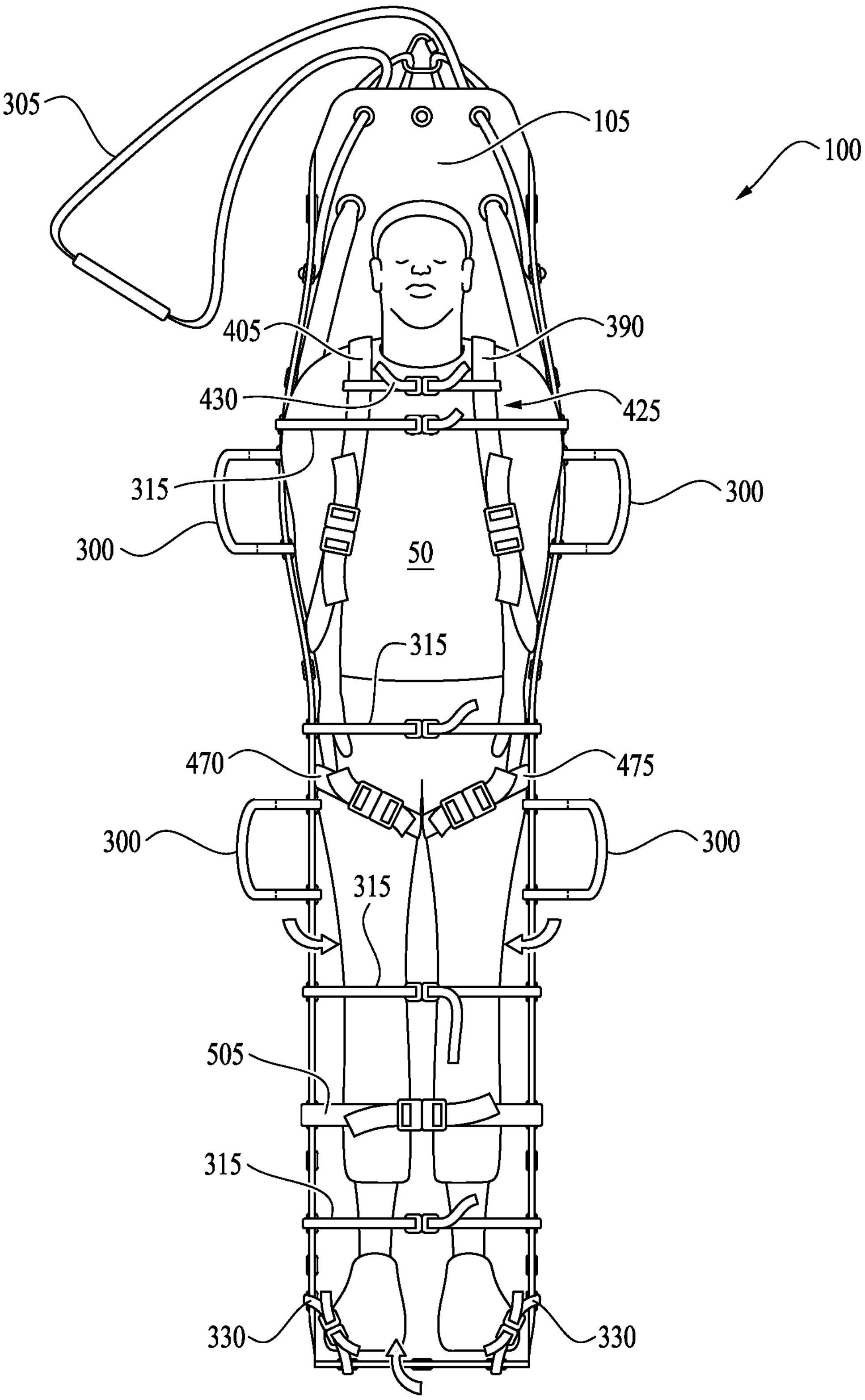
FIG. 5 illustrates an example embodiment of an injured person packaged and secured in the rescue stretcher of FIG. 1.

FIG. 4 illustrates a standalone harness system 345 of the rescue stretcher 100 in accordance with one example embodiment. With reference to FIG. 4, the harness system 345 includes a first elongated webbing member 350 and a second elongated webbing member 355. Each of the webbing members 350, 355 includes a first end 360, 375, respectively, and an opposite second end 370, 385, respectively. The respective first ends 360, 375 of the webbing members 350, 355 each have a looped handle 365, 380 formed thereon, where the looped handles 365, 380 are configured for receiving a carabiner (or other fastener) 490 to couple together the first ends 360, 375 of the webbing members 350, 355 and provide an attachment point for air lift evacuations as further described below with reference to FIGS. 6-7.

The harness system 345 further includes a shoulder harness 425 affixed to and supported by the webbing members 350, 355. In one embodiment, the shoulder harness 425 includes a first shoulder strap 390 stitched or otherwise affixed to the first webbing member 350, and a second shoulder strap 405 stitched or otherwise affixed to the second webbing member 355. As best illustrated in FIG. 2, the first shoulder strap 390 includes a first buckle 395 along a first portion of the strap 390 and a second buckle 400 along a second portion of the strap 390. Similarly, the second shoulder strap 405 includes a first buckle 410 and a second buckle 415 on opposite ends of the strap 405. In an unbuckled configuration as illustrated in FIG. 2, the shoulder straps 390, 405 extend diagonally across the front surface 120 of the base panel 105 from one side of the base panel 105 to the other. As illustrated, in one embodiment, each shoulder strap 390, 405 is weaved through corresponding slits formed on a plate 420, with the shoulder straps 390, 405 crossing one another within an interior portion of the plate 420. As further described below, the plate 420 helps retain the shoulder straps 390, 405 in position and stabilizes the shoulder harness 425 when secured around the person 50.

In one example operation, with reference to FIG. 4, the shoulder harness 425 may be fastened by mating buckles 400, 410 together and by mating buckles 395, 415 together to create two shoulder loops on either side the chest of the person 50 (see FIG. 5). Once mated, the straps 390, 405 may each be cinched tightly over the shoulders of the injured person 50 to restrain the injured person 50 against the base panel 105, with the plate 420 positioned underneath the injured person 50 to provide stability to the shoulder harness 425 as noted above. In some embodiments, the shoulder harness 425 may optionally include a stability strap 430 that buckles and connects the shoulder straps 390, 405 to another to help further stabilize the shoulder harness 425 during transport.

In another example operation, the shoulder harness 425 may instead be fastened by mating buckles 395, 400 together and by mating buckles 410, 415 together such that the straps 390, 405 cross over one another along the chest of the person 50. Once mated, the straps 390, 405 are each cinched tightly over the shoulders of the injured person 50 in a similar fashion as described above to restrain the injured person 50 against the base panel 105, with the plate 420 positioned underneath the injured person 50 to provide stability to the shoulder harness 425.

The harness system 345 further includes a leg harness 465 with a first leg loop 470 and a second leg loop 475. With reference to FIG. 4, the first leg loop 470 includes a first leg strap 435 having a portion stitched or otherwise affixed to the first webbing member 350, where the first leg strap 435 is arranged generally transverse to the first webbing member 350 (it is noted that a portion of the strap 435 is illustrated in FIG. 4 at an angle to avoid overlapping with the leg strap 450 in the illustration). The first leg strap 435 may be formed of a webbing material similar to the first webbing member 350 and preferably includes a two-piece buckle system with a first mating buckle 440 and a second mating buckle 445. Similarly, the second leg loop 475 includes a second leg strap 450 having a portion stitched or otherwise affixed to the second webbing member 355, where the second leg strap 450 is arranged generally transverse to the second webbing member 355. The second leg strap 450 may be formed of a webbing material similar to the second webbing member 355 and includes a two-piece buckle system with a first mating buckle 455 and a second mating buckle 460. It should be understood that the male and female configuration of the buckles illustrated in FIG. 4 and described above may be reversed in other embodiments without departing from the principles of the disclosed subject matter. Further, in other embodiments, different mating features and components may be used to couple the leg straps 435, 450 without departing from the principles of the disclosed subject matter.

In one example embodiment, the first leg strap 435 may be fastened around the right leg of the injured person 50 and the second leg strap 450 may be fastened around the left leg of the injured person 50, where both straps 435, 450 are cinched tightly around the respective legs of the injured person 50 to restrain the injured person 50 against the base panel 105.

In some cases, injuries to the person 50 may be severe, and may include broken bones, and/or the loss of one or both legs that results in rapid blood loss due to the rupture of major neurovascular structures. In such scenarios, the leg harness 465 may be configured as a junctional tourniquet to apply external compression and stop blood flow resulting from injuries near or at the pelvic region (e.g., body regions including the pelvis, the lower part of the abdomen, and the proximal part of the thigh). For example, with reference to FIG. 4, the second mating buckle 445 of the first leg strap 435 may be a male connector suitable for mating with the first mating buckle 455 (which may be a female connector or vice versa) of the second leg strap 450. Similarly, the second mating buckle 460 of the second leg strap 450 may be a male connector suitable for mating with the first mating buckle 440 (which may be a female connector or vice versa) of the first leg strap 435. In this configuration, the buckles 445, 455 and the buckles 440, 460 may be mated with one another such that the first and second leg straps 435, 450 together form a single, continuous strap that may be arranged to encircle the person 50 around the upper thigh area or other portion of the pelvic region of the person 50. With the person 50 secured against the rescue stretcher 100, the first and second leg straps 435, 450 are cinched tightly in this joined configuration and act as a tourniquet to provide necessary compression for hemorrhage control and minimizing blood loss. In addition, configuring the leg harness 465 as a junctional tourniquet may aid in retaining the hip bones of the person 50 in position in the event of a break or fracture to keep the person 50 properly secured and in a safe position to optimize safety when transporting the person 50 using the rescue stretcher 100.

As described above, the leg harness 465 may be deployed in two different configurations depending on the extent of the injuries and/or needs of the injured person 50. In one configuration, the leg harness 465 may function as a standard leg restraint, where the leg straps 435, 450 primarily act as a mechanism for restraining the legs of the person 50 against the rescue stretcher 100 for transport. In another configuration, the leg harness 465 may function as a junctional tourniquet by mating the leg straps 435, 450 together to form a continuous strap that encircles the person 50 and applies a compressive force when the straps are cinched tightly as needed.

With collective reference to FIGS. 2-4, the following describes an example process for coupling the harness system 345 to the base panel 105 in accordance with one embodiment. As illustrated in FIG. 2 and noted previously, when each of the loop handles 300 is weaved through the respective eyelets and coupled to the base panel 105, a passage 480 is formed between the front surface 120 of the base panel 105 and the webbing material of the loop handle 300 (illustrated for the upper left loop handle 300 in FIG. 2). The passage 480 may extend from the coupling point at which loop handle 300 extends through the respective eyelets to the respective peripheral edge 125, 130 of the base panel 105 at which the loop handle 300 is located. Similarly, the securement straps 315 each form a passage 485 between the front surface 120 of the base panel 105 and the webbing material of the securement strap 315 (illustrated for the upper left securement strap 315 in FIG. 2) when the securement straps 315 are coupled to the base panel 105. The passage 485 may extend from the coupling point at which securement strap 315 extends through the respective eyelets to the respective peripheral edge 125, 130 of the base panel 105.

As illustrated in FIG. 2, when the harness system 345 is coupled to the base panel 105, the first ends 360, 375 of the elongated webbing members 350, 355 are weaved through eyelets 260, 270, respectively, and extend outwardly along the header end 110 of the base panel 105. As noted previously, the first ends 360, 375 may be coupled together with a carabiner 490 (or other fastener). The remainder of the elongated webbing members 350, 355 is weaved through each passage 480 underneath the loop handles 300 and each passage 485 underneath the securement straps 315 to secure the respective webbing members 350, 355 to the base panel 105. As illustrated in FIG. 2, the elongated webbing members 350, 355 primarily rest on the front surface 120 of the base panel 105 and extend adjacent the respective peripheral edges 125, 130 of the base panel 105. The elongated webbing members 350, 355 then extend through the eyelets 265, 275 along a lower portion of the base panel 105. In some embodiments, the second ends 370, 385 may be outfitted with mating buckles 495, 500 to form an additional securement strap 505 (see FIG. 5) for the rescue stretcher 100 as further described in detail below.

With the webbing members 350, 355 coupled to the base panel 105 as described above, the shoulder harness 425 and the leg harness 465 are positioned relative to one another in an arrangement for receiving and securing the injured person 50 to the rescue stretcher 100. As noted above, the webbing members 350, 355 primarily rest against the front surface 120 of the base panel 105 to avoid the webbing members 350, 355 (and the chest harness 425 and the leg harness 465) contacting the ground when the injured person 50 is packaged and the rescue stretcher 100 is dragged, thereby minimizing wear and tear on the webbing members 350, 355. Moreover, the design of the harness system 345 and the method of coupling the webbing members 350, 355 to the base panel 105 accommodates some adjustability of the relative position of the shoulder harness 425 and the leg harness 465 relative to a central axis of the base panel 105. For example, a position of the shoulder harness 425 and the leg harness 465 may be adjusted upwardly toward the header end 110 of the base panel 105 by lengthening a portion of the webbing members 350, 355 that is pulled through the eyelets 260, 270. Similarly, a position of the shoulder harness 425 and the leg harness 465 may be adjusted downwardly toward the footer end 115 by lengthening a portion of the webbing members 350, 355 that is pulled through the eyelets 265, 275. By facilitating adjustment of the webbing members 350, 355, this configuration helps provide more flexibility for packaging the injured person 50 and adjusting the harness system 345 as needed.

FIGS. 5-8 collectively illustrate a deployment process of the rescue stretcher 100 for securing the injured person 50 for a dragging extraction, a vertical lift or descent extraction, or a horizontal lift or descent extraction. With general reference to FIGS. 5-8, the following description relates to an example deployment operation of the rescue stretcher 100. Prior to operation, the rescue stretcher 100 is typically secured in a rolled-up or folded configuration for optimized storage. In either configuration, the rescue stretcher 100 is carried to a position where injured person 50 is located. At the site, the rescue stretcher 100 is unrolled or unbuckled and laid flat on the ground with the rear surface of the base panel 105 contacting the ground and the front surface 120 facing upward. In some embodiments, the header and/or footer ends 110, 115 may need to be bent backward by the rescue personnel to reverse roll the header and/or footer ends 110, 115 and allow the base panel 105 to lay flat. For the folded configuration, the rescue stretcher 100 may also need to be folded back to allow the base panel 105 to lay flat. Once the base panel 105 is on the ground, all straps and harnesses are unbuckled, including the securement straps 315, the chest harness 425, and the leg harness 465, and laid flat and away from the central portion of the front surface 120 of the base panel 105 as illustrated in FIG. 2.

With the base panel 105 flat on the ground and the securement straps 315 and harnesses 425, 465 in an unbuckled configuration, the person 50 is positioned onto the base panel 105 in any suitable method depending on the extent of the injuries and the available number of able-bodied personnel. For example, the person 50 may be lifted onto the base panel 105 in cases where the injuries allow and there are capable rescue personnel available to bear the weight of the person 50. In other instances, the base panel 105 may be positioned as close as possible to the person 50 with the footer end 115 adjacent the head of the person 50. Thereafter, the person 50 may be carefully dragged onto the base panel 105 to avoid causing further injury. To help prevent lateral movement of the patient's head and minimize further injury, rescue personnel may grasp the underarms of the person 50 to drag the person 50 onto the base panel 105 until the person's head is centered on the base panel 105 adjacent the header end 115. Once the person 50 is properly positioned on the front surface 120 of the base panel 105, the person 50 is restrained to the rescue stretcher 100 using the various straps and harnesses as further described below.

With general reference to FIG. 5, to restrain the person 50, the leg loops 470, 475 are secured around the upper thighs of the injured person 50 in the groin area to keep the person 50 in the proper position. As noted previously, the relative position of the leg loops 470, 475 may be adjusted upwardly or downwardly to provide an optimal fit for the person 50 by adjusting the length of the elongated webbing members 350, 355 extending through the eyelets 260, 265, 270, 275. As noted previously, the leg harness 465 may alternately be reconfigured to function as a junctional tourniquet if necessary. Once the leg loops 470, 475 are buckled and cinched tightly, the chest harness 425 may be fastened over the shoulders of the person 50. As noted previously, the shoulder straps 390, 405 are positioned over the shoulders of the person 50 and extend either across the chest or along either side of the chest as desired. The shoulder straps 390, 405 are thereafter buckled and cinched, and the stability strap 430 may also be buckled across the chest of the person 50. In one embodiment, the shoulder straps 390, 405 retain the arms of the person 50 pinned against the body, with the shoulder straps 390, 405 positioned outside the arms to keep the arms within the rescue stretcher 100 during transport. As mentioned previously, the person 50 lays on the plate 420 to further limit movement of the shoulder straps 390, 405.

Thereafter, the securement straps 315 are stretched transversely across person 50, secured via the respective mating buckle parts 320, 325, and cinched as necessary to secure the person 50 against the base panel 105. As noted above, the second ends 370, 385 of the webbing members 350, 355 may also include mating buckles 495, 500 to form an additional securement strap 505 for the rescue stretcher 100. When the securement straps 315, 505 are cinched tightly, the left and right peripheral edges 125, 130 of base panel 105 roll inwardly toward one another so that base panel 105 cradles and restrains lateral movement of the person 50 for better support. Finally, the foot end straps 330 on the left and right peripheral edges 125, 130 may be fastened and cinched to pull the footer end 115 inwardly and create a footrest section. The foot end straps 330 may be cinched as needed to allow the person's feet to rest against the curled footer end 115.

Once the person 50 is secured on rescue stretcher 100, rescue personnel can carry the person 50 using the plurality of loop handles 300 or pull the person 50 using the drag strap 305 as necessary. In some operations, person 50 may be extracted using a combination of dragging and/or carrying techniques. For example, person 50 may be carried over some obstacles that are harder to maneuver around and dragged through narrow areas or in situations where only one rescuer is available.

Figure 6:
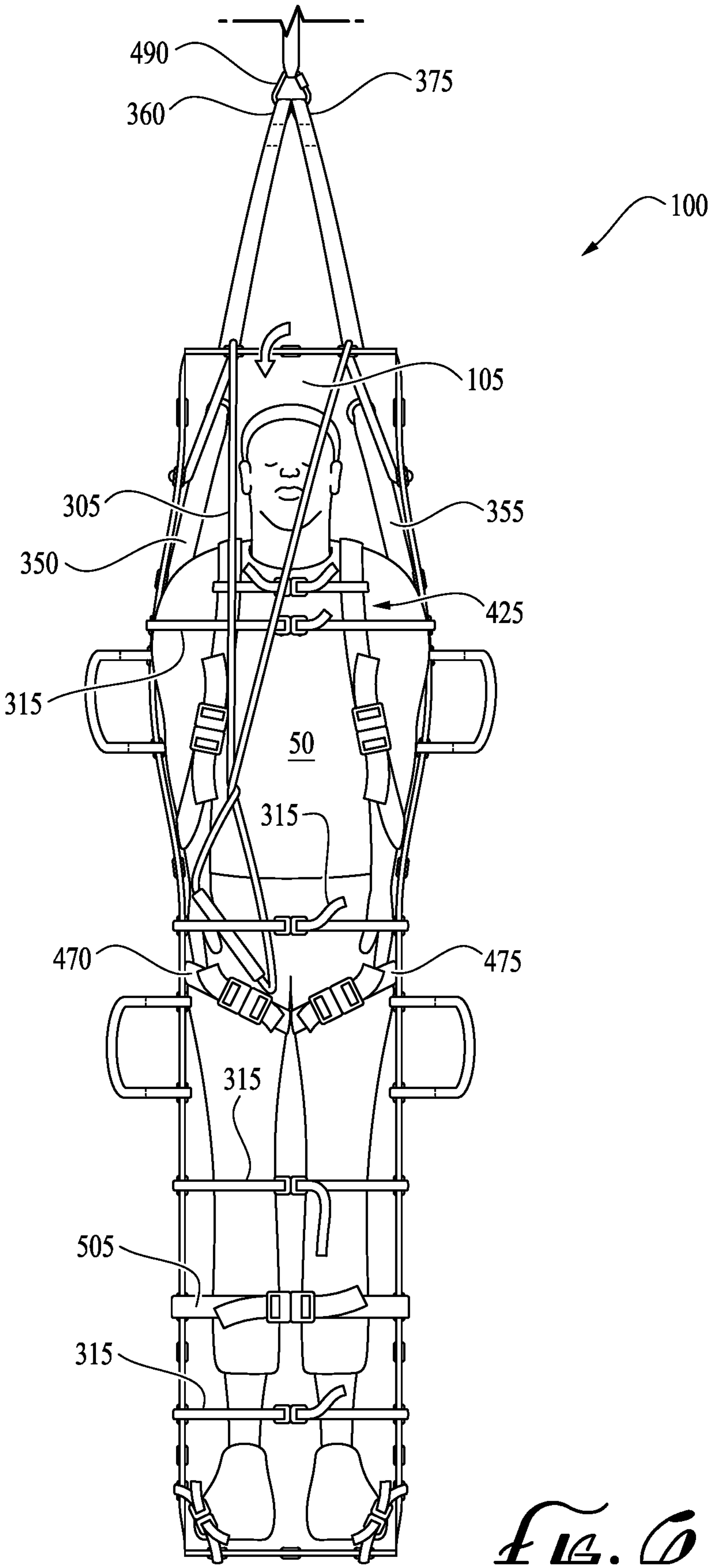
FIG. 6 illustrates an example embodiment of the rescue stretcher of FIG. 1 secured to an attachment point for a vertical lift or vertical descent extraction.
Figure 7:
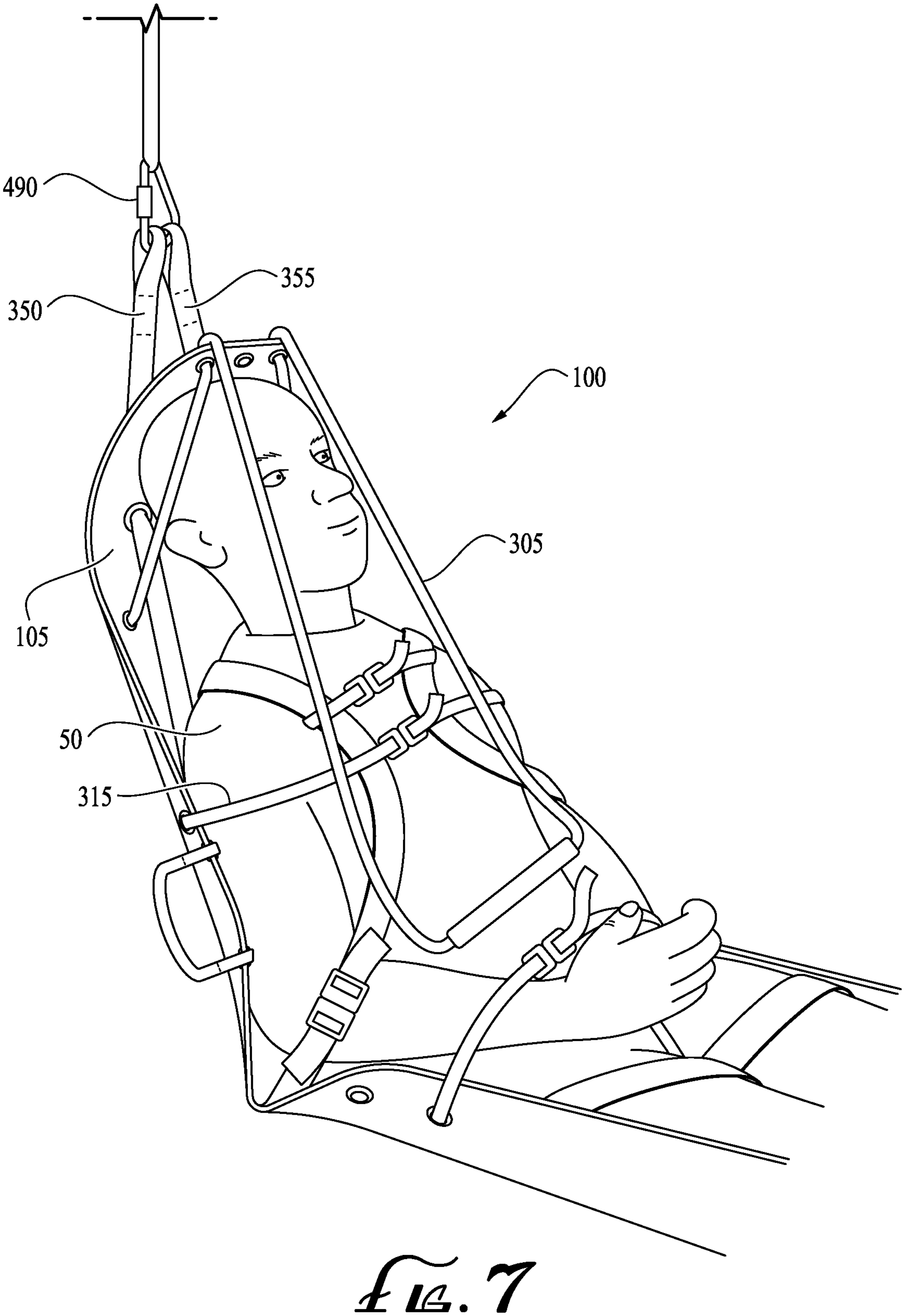
FIG. 7 illustrates an example embodiment of the rescue stretcher of FIG. 1 arranged for a vertical lift or vertical descent extraction.

FIGS. 6-7 collectively illustrate a process for preparing the injured person 50 for a vertical lift or vertical descent extraction using the rescue stretcher 100. With reference to the figures, the person 50 is secured to the rescue stretcher 100 as described above with reference to FIG. 5. Thereafter, the header end 110 of the base panel 105 is curled above the head of the injured person 50 by pulling the drag strap 305 over the injured person 50 and downwardly toward the footer end 115 of the base panel 105. Thereafter, the drag strap 305 may be tucked under and/or tied (or otherwise secured) to one or more of the securement straps 315 stretching across the base panel 105 to ensure it remains in place. As illustrated in FIG. 6, the front ends 360, 375 of the webbing members 350, 355 are coupled together via the fastener 490 to couple the webbing members 350, 355 together over the header end 110.

With reference to FIG. 7, the injured person 50 may be raised into a sitting position prior to hoisting the rescue stretcher 100 to best support the head of the injured person 50 and alleviate potential discomfort or prevent further injury. As illustrated in FIG. 7, the base panel 105 folds upwardly to raise the header end 110 and supports the injured person 50 in a more upright position, with the header end 110 cradling the head to provide additional support to the neck and head region of the person 50. When the person 50 is ready for transport, the fastener 490 may be clipped or otherwise coupled to a winch or other suitable haul system to facilitate the vertical lift or descent extraction of the rescue stretcher 100.

Figure 8:
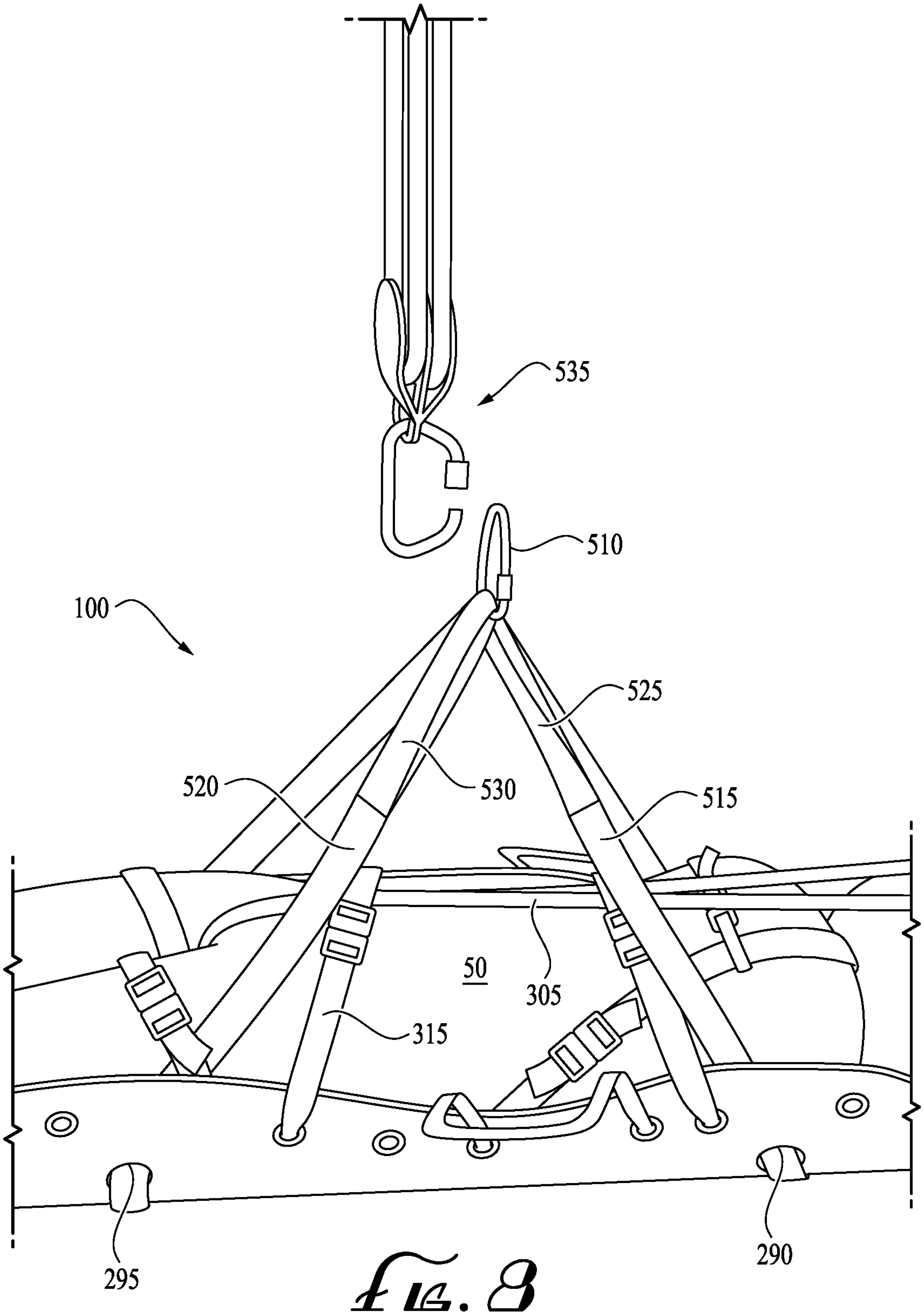
FIG. 8 illustrates an example embodiment of the rescue stretch of FIG. 1 for use during a horizontal lift or horizontal descent extraction.

FIG. 8 illustrates a process for preparing the injured person 50 for a horizontal lift or descent extraction using the rescue stretcher 100. With reference to FIG. 8, the person 50 is secured to the rescue stretcher 100 in a similar fashion as described previously with reference to FIG. 5. With reference to FIG. 8, the rescue stretcher further includes a pair of lift sling straps 515, 520, each of which includes loop handles 525, 530 formed on either end thereof to aid in a horizontal lift or descent (such as an air lift). The sling straps 515, 520 are inserted through the respective openings 290, 295 and pulled underneath the base panel 105 to support the weight of the person 50 and the rescue stretcher 100. In one embodiment, the sling strap 515 is generally positioned and aligned with the chest and shoulders of the person 50 and the sling strap 520 is generally positioned and aligned with the buttocks and upper thighs of the person 50 to stabilize the rescue stretcher 100. Once the loop handles 525, 530 have been weaved through the base panel 105, the loop handles 525, 530 are equalized over the person 50 and secured together via a carabiner 510 or any other suitable connector device. The carabiner 510 in turn is connected into a winch hook or haul line 535 for extraction.

Figure 9:
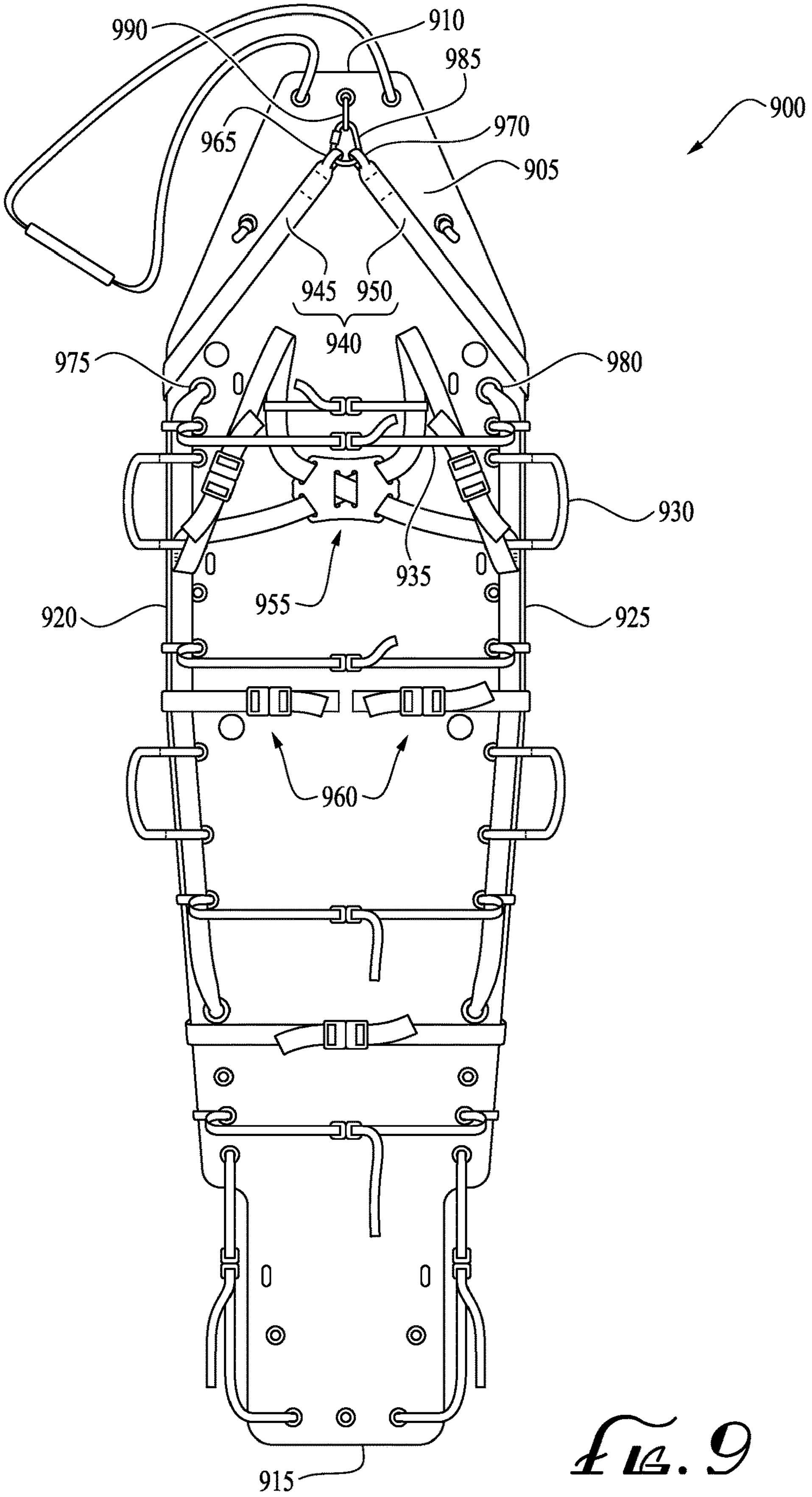
FIG. 9 illustrates a rescue stretcher in a flat configuration with a harness system and various securement straps in a buckled configuration in accordance with another embodiment.
Figure 10:
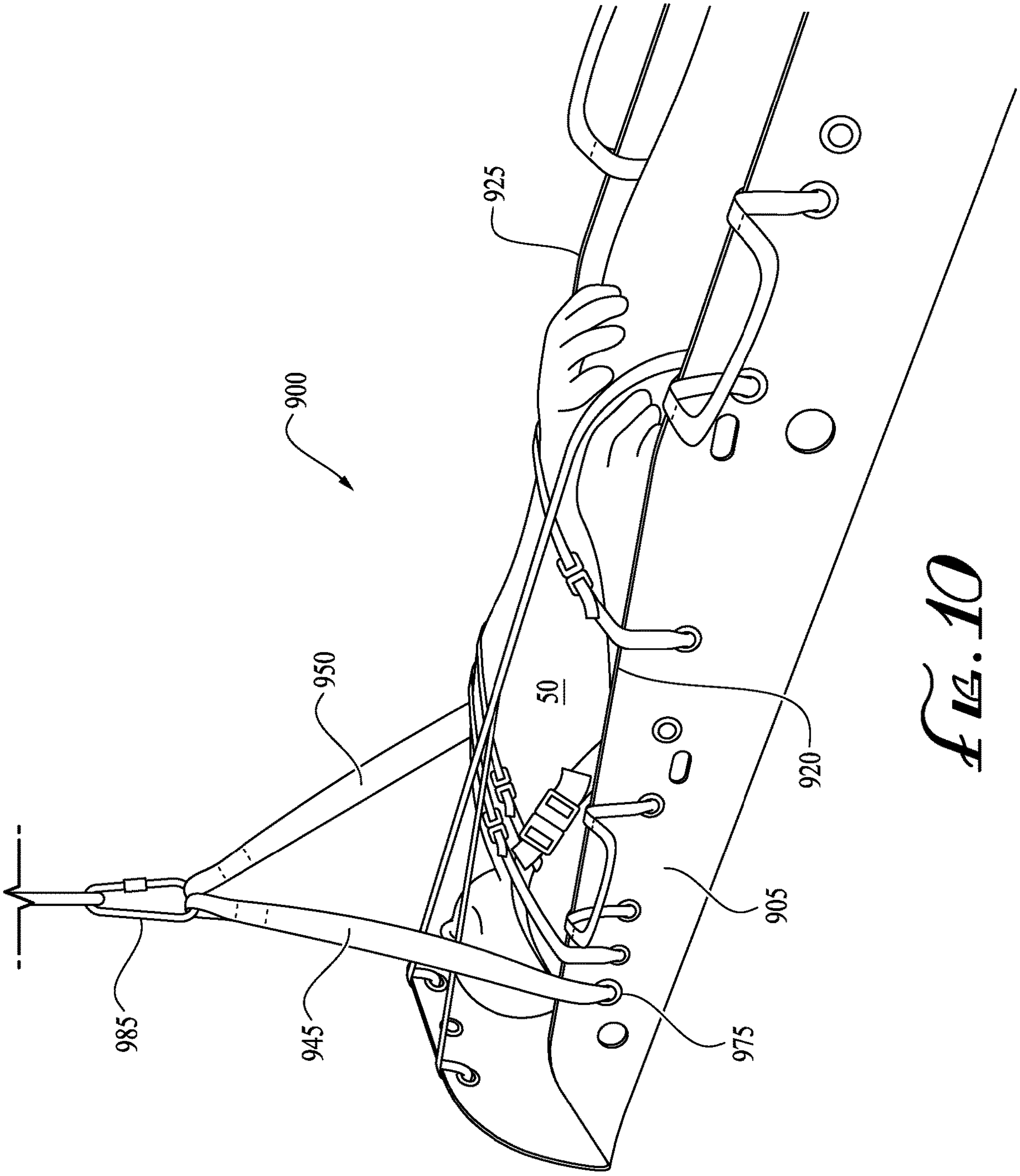
FIG. 10 illustrates an example embodiment of the rescue stretcher of FIG. 9 for use during a vertical lift or vertical descent extraction.
Figure 11:
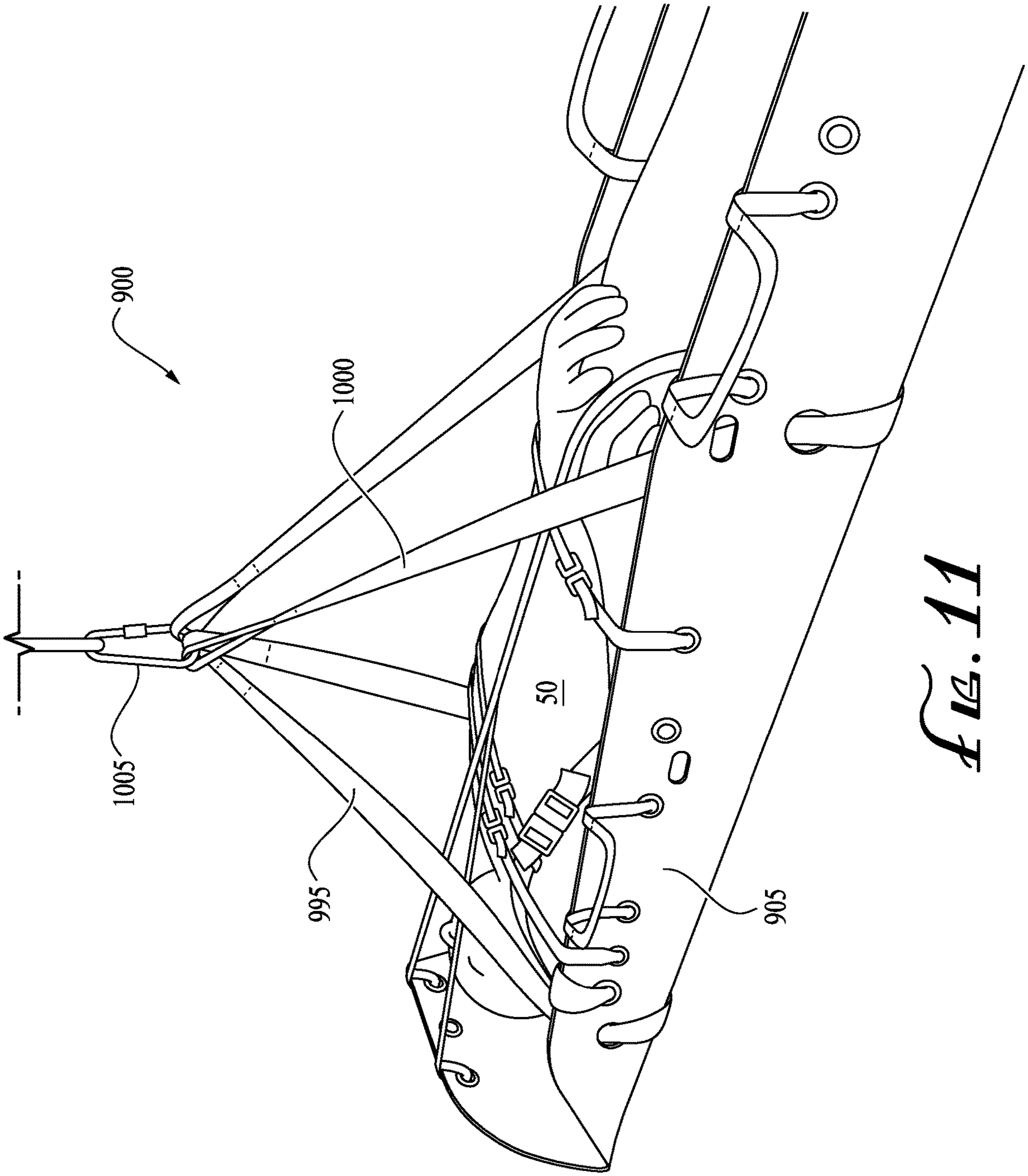
FIG. 11 illustrates an example embodiment of the rescue stretcher of FIG. 9 for use during a horizontal lift or horizontal descent extraction.

FIGS. 9-11 illustrate a rescue stretcher 900 in accordance with another embodiment. The rescue stretcher 900 may include many of the same features as described previously with reference to the rescue stretcher 100 of FIGS. 1-8. Accordingly, many aspects of the rescue stretcher 900 are not further described in detail below to avoid obscuring more pertinent aspects of the embodiment. However, it should be understood that the same features illustrated and described with reference to the rescue stretcher 100 apply equally to the rescue stretcher 900 other than the specific configurations and features described below unique to the rescue stretcher 900.

With reference to FIG. 9, the rescue stretcher 900 includes an elongated base panel 905 with a header end 910, a footer end 915, and opposite left and right peripheral edges 920, 925 spanning between the header and footer ends 910, 915. The base panel 905 is approximately 6 inches wider (across the left and right peripheral edges 920, 925) than the corresponding base panel 105 of the rescue stretcher 100. As illustrated, the rescue stretcher 900 further includes a plurality of loop handles 930 and securement straps 935 coupled to the base panel 905 in a similar fashion as described previously with respect to the corresponding components of the rescue stretcher 100. The base panel 905 further includes a harness system 940 including first and second webbing members 945, 950, a chest harness 955, and a leg harness 960 with similar functionality as the corresponding components of the rescue stretcher 100.

As illustrated in FIG. 9, the first and second webbing members 945, 950 are coupled in a slightly altered configuration as compared to the first and second webbing members 350, 355 of the rescue stretcher 100. With reference to FIG. 9, the front ends 965, 970 of the respective webbing members 945, 950 are weaved through eyelets 975, 980, wrap around to the rear surface (not shown) of the base panel 905, and are coupled to one another via a carabiner 985 (or other suitable fastener) along the front surface of the base panel 905. The carabiner 985 may in turn be coupled to the base panel 905 via another fastener 990. The eyelets 975, 980 are positioned lower on the base panel 905 relative to the header end 910 as compared to the eyelets 260, 270 of the rescue stretcher 100, where the eyelets 975, 980 are at approximately shoulder level when the injured person 50 is secured to the rescue stretcher 900.

In operation, the injured person 50 is secured to the rescue stretcher 900 in a similar fashion as described previously with respect to rescue stretcher 100. As noted above, the base panel 905 is wider as compared to the base panel 105 (e.g., 28 inches as compared to 22.5 inches for base panel 105). As such, the left and right peripheral edges 920, 925 roll upwardly and sit against the shoulders of the person 50 (see FIG. 10). The placement of the eyelets 975, 980 and the additional width of the base panel 905 allows for the first and second webbing members 945, 950 to extend outwardly from the left and right peripheral edges 920, 925 and adjacent to the shoulders of the injured person 50. In this configuration, once the person 50 is packaged in the rescue stretcher 900 and ready for transport, the first and second webbing members 945, 950 may be equalized over the upper torso or chest of the person 50 (as illustrated in FIG. 10) and secured using the fastener 985 to facilitate a vertical lift (or descent) of the rescue stretcher 900 at the shoulders of the person 50 as opposed to the lift point being behind the header end 110 as in the rescue stretcher 100 (see FIGS. 6 and 7).

For a horizontal lift or descent, as illustrated in FIG. 11, the first and second webbing members 945, 950 are left in position against the base panel 905 and secured with the carabiner 985 and the fastener 990 (see FIG. 9). Lift slings 995, 1000 may be coupled to the rescue stretcher 900 in a similar fashion as described with reference to FIG. 8. When coupled to the rescue stretcher 900, the lift sling 995 aligns generally with the shoulder area of the person 50, and the lift sling 1000 aligns generally with the lower buttocks of the person 50 to ensure the person 50 is properly supported and to minimize further injury during transport. Once the lift slings 995, 1000 are equalized and coupled together via a fastener 1005, the rescue stretcher 900 is ready for transport in a similar fashion as described previously.

It should be understood that many of the components and arrangements described in the embodiments of FIGS. 1-11 are for illustration purposes. Accordingly, one having ordinary skill in the art may rearrange the components of the embodiments described herein without departing from the principles of the disclosure. In addition, it is intended that subject matter disclosed in one embodiment herein may be combinable with the subject matter of one or more of other embodiments herein as long as such combinations are not mutually exclusive or inoperable. In addition, many variations, enhancements, and modifications of the rescue stretcher concepts described herein.

The terms and descriptions used above are set forth by way of illustration and are not meant as limitations. Those skilled in the art will recognize that many variations can be made to the details of the above-described embodiments without departing from the underlying principles of the disclosed subject matter.

The invention claimed is:

1. A stretcher comprising:

an elongate, flexible panel sized to underlay a person laying thereon, the panel including a front surface and an opposite rear surface, a header end and an opposite footer end, and a first side and an opposite second side, the panel further including a plurality of eyelets formed thereon; and a harness system including a first webbing member and a second webbing member coupled to the panel, wherein the first webbing member extends along the first side of the panel and the second webbing member extends along the second side of the panel, the harness system further including:

a shoulder harness with a first shoulder strap coupled to the first webbing member and a second shoulder strap coupled to the second webbing member, the first and second shoulder straps configured to extend over the shoulders of the person to secure the person to the panel; and a leg harness having a first leg strap coupled to the first webbing member and a second leg strap coupled to the second webbing member, each of the first leg strap and the second leg strap configured to extend around a respective leg of the person to secure the person to the panel;

wherein the harness system is adjustable relative to an axis extending from the header end to the footer end of the panel via an adjustment of a position of the first webbing member and the second webbing member.

2. The stretcher of claim 1, wherein a first portion of the first webbing member extends through a first eyelet formed along the first side of the panel and a second portion of the first webbing member extends through a second eyelet formed along the first side of the panel, and wherein a first portion of the second webbing member extends through a first eyelet formed along the second side of the panel and a second portion of the second webbing member extends through a second eyelet formed along the second side of the panel, and wherein the position of the first webbing member and the second webbing member is adjustable by pulling the first webbing member and the second webbing member through the respective first and second eyelets.

3. The stretcher of claim 1, wherein the first webbing member further includes a first coupling portion and the second webbing member further includes a second coupling portion, and wherein the first webbing member and the second webbing member each extend transversely across the panel and are coupled together via the first and second coupling portions.

4. The stretcher of claim 1, where the first shoulder strap extends across the panel from the first side to the second side, and wherein the second shoulder strap extends across the panel from the second side to the first side, the first and second shoulder straps crossing one another.

5. The stretcher of claim 4, the shoulder harness further including a plate through which the first shoulder strap and the second shoulder strap each extend to stabilize the shoulder harness.

6. The stretcher of claim 4, further comprising a stability strap including a first strap segment coupled to the first shoulder strap and a second strap segment coupled to the second shoulder strap, the first strap segment including a first coupling portion and the second strap segment including a second coupling portion, wherein the stability strap extends between the first shoulder strap and the second shoulder strap when the first coupling portion is coupled with the second coupling portion.

7. The stretcher of claim 1, further comprising:
a first securement strap including a first strap segment coupled to the panel via a first eyelet disposed along the first side of the panel, wherein a first passage is formed and disposed underneath the first strap segment such that the first passage is disposed between the first strap segment and the front surface of the panel, the first securement strap further including a second strap segment coupled to the panel via a second eyelet disposed along the second side of the panel, wherein a second passage is formed and disposed underneath the second strap segment such that the second passage is disposed between the second strap segment and the front surface of the panel, the first securement strap including a first coupling portion and a second coupling portion, wherein the first securement strap extends transversely across the panel from the first side to the second side thereof when the first coupling portion and the second coupling portion are mated,
wherein the first webbing member extends through the first passage of the first securement strap and the second webbing member extends through the second passage of the first securement strap to secure the first webbing member and the second webbing member to the panel.

8. The stretcher of claim 7, further comprising:
a first loop handle including a first handle segment coupled to the panel via a third eyelet disposed along the first side of the panel, wherein a third passage is formed and disposed underneath the first handle segment such that the third passage is disposed between the first handle segment and the front surface of the panel, the first loop handle including a second handle segment coupled to the panel via a fourth eyelet disposed along the first side of the panel, wherein a fourth passage is formed and disposed underneath the second handle segment such that the fourth passage is disposed between the second handle segment and the front surface of the panel; and
a second loop handle including a first handle segment coupled to the panel via a fifth eyelet disposed along the second side of the panel, wherein a fifth passage is formed and disposed underneath the first handle segment such that the fifth passage is disposed between the first handle segment and the front surface of the panel, the second loop handle including a second handle segment coupled to the panel via a sixth eyelet disposed along the second side of the panel, wherein a sixth passage is formed and disposed underneath the second handle segment such that the sixth passage is disposed between the second handle segment and the front surface of the panel,
wherein the first webbing member further extends through the third passage and the fourth passage of the first loop handle and the second webbing member extends through the fifth passage and the sixth passage of the second loop handle to secure the first webbing member and the second webbing member to the panel.

9. The stretcher of claim 8, further comprising:
a second securement strap including a first strap segment coupled to the panel via a seventh eyelet disposed along the first side of the panel, wherein a seventh passage is formed and disposed underneath the first strap segment such that the seventh passage is disposed between the first strap segment and the front surface of the panel, the second securement strap further including a second strap segment coupled to the panel via an eighth eyelet disposed along the second side of the panel, wherein an eighth passage is formed and disposed underneath the second strap segment such that the eighth passage is disposed between the second strap segment and the front surface of the panel, the second securement strap including a first coupling portion and a second coupling portion, wherein the second securement strap extends transversely across the panel from the first side to the second side thereof when the first coupling portion and the second coupling portion are mated,
wherein the first webbing member extends through the seventh passage of the second securement strap and the second webbing member extends through the eighth passage of the second securement strap to secure the first webbing member and the second webbing member to the panel.

10. The stretcher of claim 1, further comprising:
a first loop handle including a first handle segment coupled to the panel via a first eyelet disposed along the first side of the panel, wherein a first passage is formed and disposed underneath the first handle segment such that the first passage is disposed between the first handle segment and the front surface of the panel, the first loop handle including a second handle segment coupled to the panel via a second eyelet disposed along the first side of the panel, wherein a second passage is formed and disposed underneath the second handle segment such that the second passage is disposed between the second handle segment and the front surface of the panel; and
a second loop handle including a first handle segment coupled to the panel via a third eyelet disposed along the second side of the panel, wherein a third passage is formed and disposed underneath the first handle segment such that the third passage is disposed between the first handle segment and the front surface of the panel, the second loop handle including a second handle segment coupled to the panel via a fourth eyelet disposed along the second side of the panel, wherein a fourth passage is formed and disposed underneath the second handle segment such that the fourth passage is disposed between the second handle segment and the front surface of the panel,
wherein the first webbing member extends through the first passage and the second passage of the first loop handle and the second webbing member extends through the third passage and the fourth passage of the second loop handle to secure the first webbing member and the second webbing member to the panel.

11. The stretcher of claim 10, further comprising:
a first securement strap including a first strap segment coupled to the panel via a fifth eyelet disposed along the first side of the panel, wherein a fifth passage is formed and disposed underneath the first strap segment such that the fifth passage is disposed between the first strap segment and the front surface of the panel, the first securement strap further including a second strap segment coupled to the panel via a sixth eyelet disposed along the second side of the panel, wherein a sixth passage is formed and disposed underneath the second strap segment such that the sixth passage is disposed between the second strap segment and the front surface of the panel, the first securement strap including a first coupling portion and a second coupling portion, wherein the first securement strap extends transversely across the panel from the first side to the second side thereof when the first coupling portion and the second coupling portion are mated, wherein the first webbing member further extends through the fifth passage of the first securement strap and the second webbing member extends through the sixth passage of the first securement strap to secure the first webbing member and the second webbing member to the panel.

12. The stretcher of claim 11, further comprising:

a second securement strap including a first strap segment coupled to the panel via a seventh eyelet disposed along the first side of the panel, wherein a seventh passage is formed and disposed underneath the first strap segment such that the seventh passage is disposed between the first strap segment and the front surface of the panel, the second securement strap further including a second strap segment coupled to the panel via an eighth eyelet disposed along the second side of the panel, wherein an eighth passage is formed and disposed underneath the second strap segment such that the eighth passage is disposed between the second strap segment and the front surface of the panel, the second securement strap including a first coupling portion and a second coupling portion, wherein the second securement strap extends transversely across the panel from the first side to the second side thereof when the first coupling portion and the second coupling portion are mated, wherein the first webbing member extends through the seventh passage of the second securement strap and the second webbing member extends through the eighth passage of the second securement strap to secure the first webbing member and the second webbing member to the panel.

13. The stretcher of claim 1, wherein a first portion of the first webbing member and a second portion of the second webbing member extend beyond a header end of the panel and each includes a looped handle, the stretcher further comprising a fastener coupling the looped handles of the first webbing member and the second webbing member.

14. The stretcher of claim 1, wherein the first leg strap coupled to the first webbing member includes a first coupling portion and a second coupling portion configured to mate with one another to form a first leg loop of the leg harness, and wherein the second leg strap coupled to the second webbing member includes a third coupling portion and a fourth coupling portion configured for mating with one another to form a second leg loop of the leg harness.

15. The stretcher of claim 14, wherein the first coupling portion of the first leg strap and the third coupling portion of the second leg strap are configured to mate with one another, and wherein the second coupling portion of the first leg strap and the fourth coupling portion of the second leg strap are configured to mate with one another, the first leg strap and the second leg strap forming a single, extended strap encircling the person on the stretcher.

16. The stretcher of claim 1, further comprising a drag strap coupled to the panel and extending beyond the header end.

17. The stretcher of claim 1, further comprising a first lift sling coupled to the panel and extending transversely along the rear surface of the panel, and a second lift sling coupled to the panel and extending transversely along the rear surface of the panel, the first and second lift slings each including a looped handle, the stretcher further including a fastener coupling the looped handles of the first and second lift slings together.

18. The stretcher of claim 1, wherein the first webbing member extends through a first eyelet formed along the first side of the panel and the second webbing member extends through a second eyelet formed along the second side of the panel, and wherein the first webbing member and the second webbing member each includes a looped handle, the stretcher further comprising a fastener coupling the looped handles along the front surface of the panel.

19. The stretcher of claim 18, wherein the fastener is releasable from the panel, the first and second webbing members providing a lift point configured to be aligned with the shoulders of the person configured to be secured to the panel.

20. The stretcher of claim 1, wherein the first webbing member extends continuously along and sits against the front surface of the panel between a first coupling point and a second coupling point on the panel, and wherein the second webbing member extends continuously along and sits against the front surface of the panel between a third coupling point and a fourth coupling point on the panel.

* * * * *